(12) United States Patent
Kraemer et al.

(10) Patent No.: US 10,606,759 B2
(45) Date of Patent: Mar. 31, 2020

(54) FIRMWARE OR HARDWARE COMPONENT ASSIST FOR MEMORY MAPPED I/O

(71) Applicant: INTERNATIONAL BUSINESS MACHINES CORPORATION, Armonk, NY (US)

(72) Inventors: Marco Kraemer, Sindelfingen (DE); Carsten Otte, Stuttgart (DE); Christoph Raisch, Gerlingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

(21) Appl. No.: 15/407,621

(22) Filed: Jan. 17, 2017

(65) Prior Publication Data

US 2018/0203804 A1 Jul. 19, 2018

(51) Int. Cl.
*G06F 12/10* (2016.01)
*G06F 12/1009* (2016.01)
(Continued)

(52) U.S. Cl.
CPC .......... *G06F 12/1009* (2013.01); *G06F 3/064* (2013.01); *G06F 3/0611* (2013.01);
(Continued)

(58) Field of Classification Search
CPC .... G06F 12/1009; G06F 3/0611; G06F 3/064; G06F 3/0665; G06F 3/0673;
(Continued)

(56) References Cited

U.S. PATENT DOCUMENTS

| 8,645,951 | B2 | 2/2014 | Wang et al. |
| 2012/0210095 | A1* | 8/2012 | Nellans ................... G06F 12/10 711/206 |

(Continued)

OTHER PUBLICATIONS

Schupbach et al., "A Declarative Language Approach to Device Configuration", Architectural Support for Programming Languages and Operating Systems Conference (ASPLOS), Mar. 5-11, 2011, Newport Beach, California, (13 pages).

(Continued)

*Primary Examiner* — Reginald G Bragdon
*Assistant Examiner* — Edward Wang
(74) *Attorney, Agent, or Firm* — Steven Chiu, Esq.; Kevin P. Radigan, Esq.; Heslin Rothenberg Farley & Mesiti P.C.

(57) ABSTRACT

A method is provided for providing access to a data block in a device of a processing system. The device is connected to a processor of the processing system via an extension bus, and the processing system includes a memory connected to the processor via a memory bus, an operating system and hardware and/or firmware components for controlling access to the device. The method includes adding by the operating system for the data block a first entry in a page table of the processing system. The added entry represents the data block. A memory management unit (MMU) of the processing system may receive a request of the data block. Upon receiving the request, the MMU may instruct one of the hardware or firmware components to provide access to the data block using the added entry.

20 Claims, 4 Drawing Sheets

(51) Int. Cl.
*G06F 3/06* (2006.01)
*G06F 12/1027* (2016.01)

(52) U.S. Cl.
CPC .......... *G06F 3/0665* (2013.01); *G06F 3/0673* (2013.01); *G06F 12/1027* (2013.01); *G06F 2212/1024* (2013.01); *G06F 2212/152* (2013.01); *G06F 2212/657* (2013.01)

(58) Field of Classification Search
CPC ......... G06F 12/1027; G06F 2212/1024; G06F 2212/152; G06F 2212/657
See application file for complete search history.

(56) References Cited

U.S. PATENT DOCUMENTS

| | | |
|---|---|---|
| 2013/0042062 A1 | 2/2013 | Bickelman et al. |
| 2015/0095548 A1 | 4/2015 | Tsirkin et al. |
| 2015/0127871 A1 | 5/2015 | Desai |
| 2018/0088976 A1* | 3/2018 | Leslie-Hurd ........ G06F 9/45558 |

OTHER PUBLICATIONS

IBM, "z/Architecture—Principles of Operation," IBM Publication No. SA22-7832-10, 11th Edition, Mar. 2015, pp. 1-1732.

IIBM, "Power ISA™ Version 2.07B," International Business Machines Corporation, Apr. 9, 2015, pp. 1-1527.

* cited by examiner

FIRMWARE OR HARDWARE COMPONENT ASSIST FOR MEMORY MAPPED I/O

BACKGROUND

The present invention relates to the field of digital computer systems, and more specifically, to a method for providing access to a data block in an input/output (I/O) device.

Conventional computer systems allow mapping a peripheral component interconnect (PCI) address space into central processing unit (CPU) physical address space based on physical addresses obtained using virtual memory address-to-physical address translations that are typically stored in page table entries of a page table. Each page table entry has a page table entry address. The translations are provided by an operating system. It is the responsibility of the operating system to map the virtual address provided by a given process to the physical address of the actual device memory where that data is stored. Furthermore, a memory controller may receive the physical address. And the memory controller may use a mapping of the device address space into CPU physical address space to forward the received request to a device whose memory range contains the requested address.

However, not all CPU architectures allow to map the device address space into CPU physical address space. Thus, there is a need to provide alternatives while maintaining applications which rely on mapped PCI addresses.

SUMMARY

In one or more aspects, a method is provided which includes providing access to a data block in a device of a processing system, the device being connected to a processor of the processing system via an extension bus, the processing system also including a memory connected to the processor via a memory bus, one or more components for controlling access to the device, and the processing system including an operating system. The providing includes: adding by the operating system for the data block a first entry in a page table of the processing system, the added entry representing the data block; receiving by a memory management unit (MMU) of the processing system a request of the data block; instructing by the MMU one component of the one or more components to provide access to the data block using the added entry.

In another aspect, a system is provided for facilitating access to a data block. The system includes a memory, and a processor communicatively coupled with the memory. The system performs a method, including providing access to a data block in a device of the system, the device being connected to the processor by an extension bus, and the system including one or more components for controlling access to the device. Providing the access includes: adding by the operating system for the data block a first entry in a page table of the processing system, the added entry representing the data block; receiving by a memory management unit (MMU) of the processing system a request of the data block; and instructing by the MMU one component of the one or more components to provide access to the data block using the added entry.

Additional features and advantages are realized through the techniques of the present invention. Other embodiments and aspects of the invention are described in detail herein and are considered a part of the claimed invention.

BRIEF DESCRIPTION OF THE DRAWINGS

One or more embodiments of the present invention are explained in greater detail, by way of example only, with reference to the drawings, in which.

DETAILED DESCRIPTION

The descriptions of the various embodiments of the present invention herein are presented for purposes of illustration, and are not intended to be exhaustive or limiting. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may have the advantage of enabling a memory mapping for data blocks in a device's memory such as a PCI device's memory. With the present method, a short cut of the time consuming address translation activities may be made such that the operating system (OS) is not used to retrieve or generate the physical address, but rather or in addition, the OS is configured to create an entry having a different structure without indication of the physical address as described below.

Another advantage may reside in the fact that a mapping of the device address space into CPU physical address space is not required. For example, a systematic initialization of the device memory to be mapped in a given memory range may be prevented. Further, the access or mapping to physical addresses may be performed on demand. For example, in a conventional system the mapping of the device memory space to the CPU address space would be performed regardless if the device memory is accessed or not. Thus, the present method may save processing resources.

The present method may further have the advantage of reducing the access latency or time to data block in devices such as PCI devices. This is because, the time required by the OS to generate the physical address is higher than the time required by the hardware or firmware component to generate the same physical address. The access time is the time required between the requests made for a read or write operation until the time the data block is made available or written at the requested location.

The term "virtual address" as used herein includes an address referred to as a logical or a linear address that is a non-physical address in a virtual address space defined by a software, a processor, or a user process. Depending on the implementation, a virtual address space may or may not be scattered in memory.

As used herein the term "physical address" or "absolute address" refers to an address that is used to retrieve a content of a physical memory (e.g. the memory unit). A "physical address space" is a space of physical addresses.

Various embodiments discussed herein provide a method for providing access to a data block and data processing system as described by the subject matter of the independent claims. Advantageous embodiments are described in the dependent claims. Embodiments of the present invention can be freely combined with each other if they are not mutually exclusive.

In one or more aspects, the invention relates to a processing system for providing access to a data block in a device of the processing system. The device is connected to a processor of the processing system via an extension bus. The processing system includes a memory connected to the processor via a memory bus. The processing system further includes hardware and/or firmware components for controlling access to the device. The processing system further includes an operating system, wherein the operating system is configured for adding for the data block a first entry in a page table of the processing system, the added entry representing the data block; and a memory management unit (MMU) of the processing system being configured for receiving a request of the data block; and instructing one of the hardware and firmware components to provide access to the data block using the added entry.

According to one embodiment, upon receiving the request, the method includes checking by the MMU the page table for determining that the first entry represents the requested data block.

According to one embodiment, the MMU includes a translation lookaside buffer (TLB) wherein in response to receiving of the request the method further includes determining whether an entry of the TLB corresponds to the data block, and in response to detecting a TLB miss for the requested data block, performing the checking. This embodiment may be advantageous at it may be seamlessly integrated in the existing systems having a TLB implemented feature. Further, this embodiment may save resources that would otherwise be required in case the checking step is also performed for TLB hits.

According to another embodiment, the method further includes controlling the MMU for preventing creation of an entry in the TLB indicating the data block. Adding the TLB entry may change the execution flow of following instructions. Therefore, the present embodiment may enable to operate on the same path again for consecutive instructions.

According to one embodiment, upon receiving the request the method may further include determining if the first entry represents the data block, in response to determining that the first entry represents the data block, creating a TLB entry including the first entry in a TLB of the MMU, triggering a repeating of the receiving step, wherein the instructing step is performed in response to identifying in the TLB the first entry that represents the data block. This embodiment may be advantageous at it may be seamlessly integrated in the existing systems having a TLB implemented feature.

According to one embodiment, the instructing of the one of the hardware (HW) and firmware (FW) components further includes: using the first entry for generating an address where the data block is stored in the device, performing a first reading of the data block from the device using the generated address, loading the read data block into the memory, performing a second reading of the data block from the memory. The memory into which the read data block is loaded may be the FW/HW owned memory. This may enable to run software written for computer systems with memory mapped I/O on computer systems without direct memory I/O mapping.

According to one embodiment, the first reading is performed via a PCI host bridge (PHB) of the processing system. This embodiment may be advantageous at it may be seamlessly integrated into existing systems having a PCI implemented feature. For example, the one of the hardware and firmware components may instruct the PHB to perform the first reading and to load the result of reading into the FW/HW owned memory.

According to one embodiment, adding the first entry includes: sending by the operating system a request to the hardware and/or firmware component for adding the entry; adding the entry upon receiving an acknowledgment from the hardware or firmware component, wherein the added entry includes information on the sender of the acknowledgement. The entry may be created using the received information. This embodiment may be referred to as a negotiation embodiment or negotiation method.

The indicated storage characteristics may include at least part of the entry attributes described below. The added entry includes information on the sender of the acknowledgement and/or the requested storage characteristics.

For example, the negotiation may be performed at once for at least part of the entry attributes described below. In case the negotiation is performed at once for all entry attributes, a single acknowledgement may be received and may be sufficient to add the entry in accordance with the negotiated entry attributes. For example, the OS may request (the one of hardware and firmware components) which read/write/execute permissions can be used for the requested data block and whether the added entry is a valid or invalid entry for the requested data block. The acknowledgment may include values of indicators that are associated with both entry attributes, namely, "read/write/execute permissions" and "valid or invalid entry". In this example, the two entry attributes may be sufficient to create the entry for the requested data block.

In another example, the negotiation may be performed for each attribute of the entry attributes listed below. In this example, the entry may be added when all the acknowledgments associated with respective negotiated attributes are received.

In a further example, the one of the hardware and firmware components may send a rejection to the received request. In this case, the entry may not be added. In another example, in case of receiving a rejection, the operating system may send a further request for requesting other entry attributes. The other entry attributes may or may not include part of the rejected entry attributes.

Furthermore, since the access time depends on the physical characteristics and access mode used to access data blocks, the present method may provide a controlled method for controlling the access time, e.g., by choosing the characteristics, for instance, type of storage, that may reduce the access time.

Still further, this embodiment may enable the one of the hardware and firmware components to have a full control of the (content of) entry addition or creation compared to the method where the OS can define or propose the content of the entry to be added as described below.

According to one embodiment, adding the first entry includes registering by the operating system with the hardware and/or firmware components the entry to be added; adding the first entry upon receiving a confirmation from the hardware or firmware component. The registering of the entry includes registering values of at least part of bits forming the entry. This embodiment may have the advantages described above with reference to the negotiation embodiment. Further, this embodiment may provide an alternative method for defining the content of the added entry at the operating system instead of the hardware or firmware components.

According to one embodiment, wherein the added entry indicates at least one of (referred to as entry attributes): the added entry is a valid or invalid entry; the one of the hardware and firmware components; the data block being a read only data block; storage characteristics for storing the data block, the storage characteristics include at least one of storage technology for storing the data block, copy on write, read/write/execute permissions, locking in the device.

For example, the added entry may include multiple indicators each associated with the above listed entry attributes. For that, the added entry may be provided with a plurality of hardware or firmware control data structures (e.g. bits) that represent the indicators. For example, an indicator of the indicators may have a combination of one or more values of one or more bits of the added entry. The values of the bits may be provided by the one of the hardware and firmware components or by the operating system.

This embodiment may provide a page table entry that contains enough information to provide the physical address in accordance with the present disclosure. For example, the one of the hardware and firmware components may use a given virtual address of the first data object and the content of the added entry associated with the given virtual address in order to generate or retrieve the physical address that is associated with the given virtual address via that content. For example, the one of the hardware and firmware components may store a mapping between the content of the added entries and the physical addresses of the data objects associated with the entries. Upon identifying a page table entry using a given virtual address of a given data object, the one of the hardware and firmware components may use the mapping in order to map the content of the identified page table entry in order to find the physical address that is associate with that content i.e. associated with the given virtual address.

The added entry may have a simple internal structure compared to existing entries and may thus be easily discovered by the one of the hardware and firmware components.

According to one embodiment, the method further includes selecting the one of the hardware and firmware components using the information stored in the added entry.

According to one embodiment, the one of the hardware and firmware components includes the sender of the acknowledgement. If one of the hardware or firmware components answered positively after negotiation, it will be used for requesting a given physical address later on once a process requests the virtual address that corresponds to that given physical address. This may save time that would otherwise be required for sending two requests in case one of the hardware or firmware components has no control access to the requested partition of the first data object. For example, if the hardware component has no control access to the partition of the first data object the MMU may have to send again the instruction (that has already been sent to the hardware component) to the firmware component to request the physical address of the partition of the first data object. This may be prevented by the present method.

According to one embodiment, the added entry includes information indicating the entry as a valid or invalid entry, wherein the instructing step is performed if the first entry is a valid entry.

According to an embodiment, a 1-bit "valid bit" may be used to indicate that the entry is a valid or invalid entry. If the valid bit is set (to 1), the requested data block is in the device. The valid bit may be set to either a "1" value to indicate a valid entry, or a "0" value to indicate an invalid entry. Qualifying a 1-bit valid bit instead of a (multi-) valid bit may preserve processor resource and improve performance.

According to one embodiment, the added entry includes information indicating hardware or firmware components, wherein the instructing step includes reading the information for determining the one of the hardware and firmware components from which the first physical address is to be obtained.

According to an embodiment, a 1-bit "HW/FW bit" may be used to indicate the hardware or firmware component. The HW/FW bit may be set to either a "1" value to indicate hardware component, or a "0" value to indicate a firmware component. Qualifying a HW/FW bit may preserve processor resource and improve performance compared to a case where the source of the first physical address is unknown.

According to one embodiment, the operating system includes a hypervisor. For example, the OS may run in kernel mode to function as a hypervisor and/or may run limited user functions.

Figure 1:
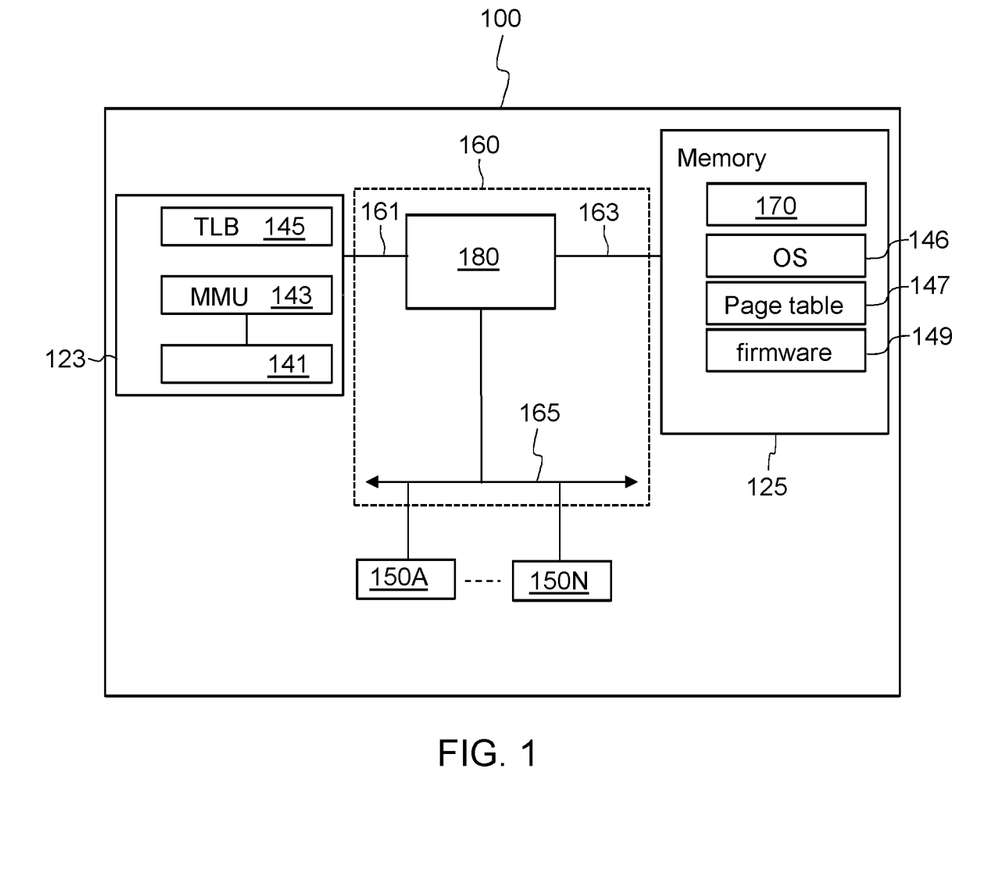
FIG. 1 shows a diagram of a data processing system, in accordance with one or more aspects of the present invention.

FIG. 1 shows a diagram of a data processing system 100 according to an example embodiment of the present disclosure.

Data processing system 100 may include, but not be limited to, a processor system or processor unit 123 and a memory unit 125. Memory unit 125 may include computer system readable media in the form of volatile memory, such as random access memory (RAM) and/or cache memory.

The data processing system 100 includes a bus system 160 for connecting the different components of the data processing system 100. An example bus system 160 as shown in FIG. 1 includes a processor bus 161, memory bus 163 and a I/O bus (or extension bus) 165 such as a PCI bus.

The processor bus 161 is connected to a controller 180 which provides an interface to memory unit 125 via memory bus 163. Controller 180 further provides an interface to I/O bus 165. Controller 180 may for example include a memory controller for controlling access to memory 125 and a device controller for controlling access to devices 150A-N. For example, in case of a PCI configuration the device controller may include a PHB.

I/O bus 165 connects the devices 150A-N to other components of the data processing system 100. In case of a PCI configuration, the PHB provides an interface for bus 165 to connect to the one or more devices 150A-N being PCI devices.

A device 150A-N may for example include a storage system for the data processing system 100 which may include a hard disk drive (HDD).

Processor system 123 may include a processor 141 that communicates with memory management unit (MMU) 143. Processor system 123 may further include a translation lookaside buffer (TLB) 145 that stores recently used address mappings in order to avoid accesses to page tables 147 in memory unit 125.

Processor 141 may be a hardware device for executing software, particularly that stored in memory unit 125. The processor 141 can be any custom made or commercially available processor, a central processing unit (CPU), an auxiliary processor among several processors associated with the data processing system 100, a semiconductor based microprocessor (in the form of a microchip or chip set), a macroprocessor, or generally any device for executing software instructions.

MMU 143 includes address translation circuitry that performs address translation from a virtual page number to a physical page number wherein virtual addresses are translated to physical addresses. A page table 147 of the page tables 147 may for example be created by the OS 146 upon starting a process at the data processing system 100. In another example, the page table 147 may be comprised in the MMU 143.

The memory unit 125 may include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory unit 125 can have a distributed architecture, where various components are situated remote from one another, but can be accessed by the processor 141.

Memory unit 125 may include (e.g. in the RAM) one or more separate programs e.g. application 170, each of which includes an ordered listing of executable instructions for implementing logical functions, notably functions involved in embodiments of this invention. The software in memory unit 125 shall also typically include a suitable operating system (OS) 146. The OS 146 essentially controls the execution of other computer programs, such as possibly application 170 for implementing methods as described herein. The application 170 may be configured for performing I/O requests. An "I/O request" refers to a request submitted to access (read and/or write) content of device 150A-N, where the request specifies the access e.g. of a data block.

Memory unit 125 may further include a firmware component 149 such as a basic input/output system (BIOS). The BIOS is a set of essential software routines that initialize and test hardware at startup, start the OS 146, and support the transfer of data among the hardware devices. The BIOS may be stored in ROM so that the BIOS can be executed when the data processing system 100 is activated. The firmware component may be configured to initialize the device's 150A-N memory.

A hardware component as used herein may include processor 141 and/or a custom logic chip and/or an FPGA that is connected to the processor system 123 and memory unit 125.

In another example, the data processing system 100 may enable a virtualization environment. The hypervisor may run or control one or more virtual machines (or guest machines). What is described below with reference to OS 146 may hold true for the hypervisor. For example, the method performed by the OS 146 in order to provide access to data as described herein may also be performed by the hypervisor.

One operational embodiment of the data processing system 100 as described below in detail with reference to FIGS. 2-6.

Figure 2:
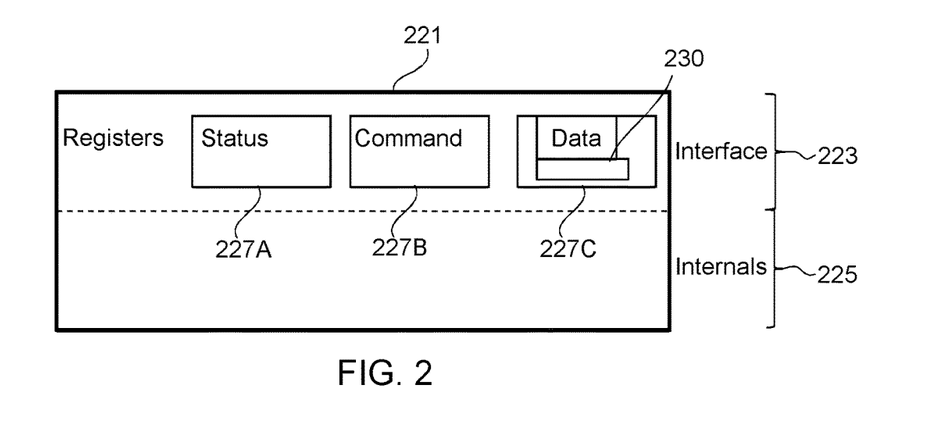
FIG. 2 shows a diagram of a device such as a PCI device, in accordance with one or more aspects of the present invention.

FIG. 2 shows a diagram of a PCI device 221 (e.g. such as device 150A-N) in accordance with one or more aspects of the present method. Device 221 includes two components. The first component 223 may be the hardware interface that allows the control of the operation of the device 221. The first component 223 may include registers 227A-C. Each of the registers 227A-C may be accessible via one or more I/O ports.

Register 227A may be a status register, which can be read to see the current status of the device 221.

Register 227B may be a command or a PCI configuration register that indicates one or more tasks to be performed by the device 221. The PCI configuration register 227B may consist of a given number of bytes (e.g. 256) of registers. The PCI configuration register may consist of two parts, first bytes (e.g. first 64 bytes) are called PCI configuration register header and the rest are called device-specific PCI configuration register. The PCI configuration register header comprises Base address Registers (or BARs) that can be used to hold memory addresses used by the device 221.

Register 227C may be a data register to pass or store data e.g. in form of one or more data blocks 230 to the device 221, or get or read data from the device 221.

By reading and writing these registers 227A-C, the behavior of the device 221 may be controlled.

The second component 225 of device 221 provides the internal structure of the device 221. For example, the second component 225 may include one or more hardware chips to implement the function of the device 221. In one example, the second component 225 may include a CPU, general purpose memory, and/or other device-specific chips.

Device 221 may be adapted to operate in accordance with a given protocol for interaction with the other components of the data processing system 100 such as processor 141.

Figure 3:
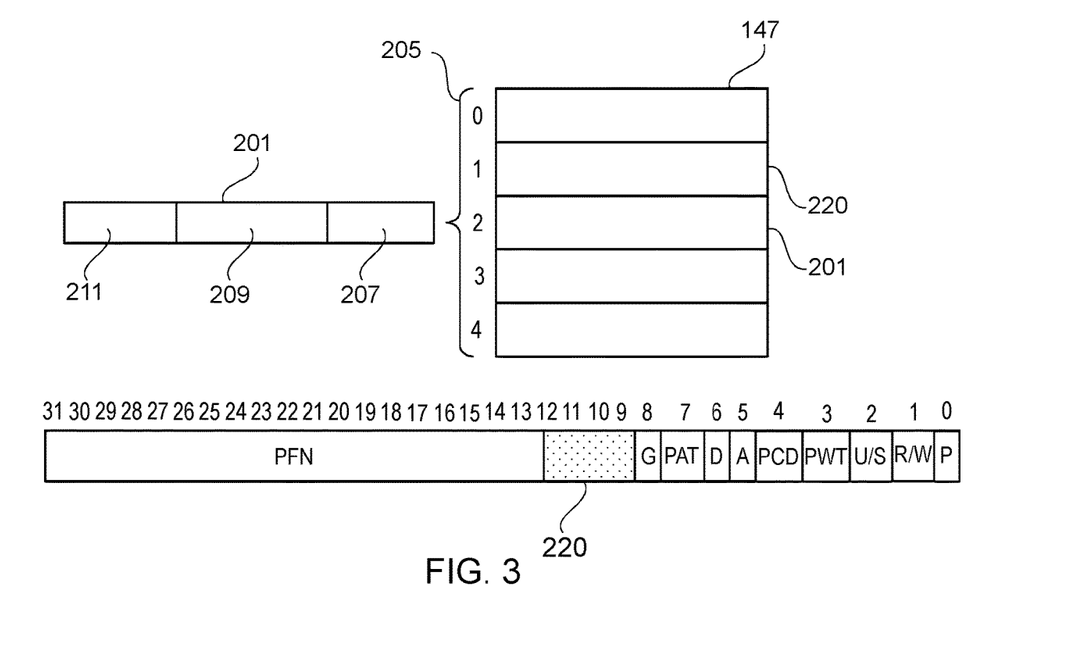
FIG. 3 illustrates an exemplary content of a page table, in accordance with one or more aspects of the present invention.

FIG. 3 illustrates an exemplary content of page table 147 in accordance with present disclosure. FIG. 3 shows an example page table entry 201 of the page table 147 for a given data block 230. For example, for each data block 230 of the device 221, the OS 146 may be configured to create a respective page table entry having the structure of the page table entry 201. For example, a page table entry 201 may be created upon receiving a request to access the data block 230.

In contrast to conventional page table entries, the page table entry 201 is provided without indication of a physical address, e.g., there is no indication of a physical frame number (PFN).

The page table entry 201 may include at least one field of one or more bits. The structure of the page table entry 201 may be newly determined (e.g. from scratch) or may be determined based on existing structures of page table entries as described below.

In one example, a first field 207 may indicate that the page table entry 201 is a valid or invalid entry. The first field 207 may include a 1-bit "valid bit". The valid bit may be set to either a "1" value to indicate a valid entry, or a "0" value to indicate an invalid entry. A second field 209 of the page table entry 201 may indicate that the page table entry 201 is a special entry in that it has a structure as defined by the present method. The second field 209 may include a 1-bit "special entry bit". The special entry bit may be set to "1" value to indicate that the entry is a special entry. The values of the one or more bits in the second field 209 may define an I/O key value that can be used as an identification number for the requested data block 230. This second field 209 may particularly be advantageous in case the page table 147 includes page table entries such as page table entry 220 having different structure than the page table entry 201. A third field 211 of the page table entry 201 may indicate the one of the hardware and firmware component that is able to provide access to the data block 230 e.g. provide the physical address (e.g. address where the data block is stored in device 221) that corresponds to the page table entry 201. The third field 211 may include a 1-bit "HW/FW bit" to indicate the hardware or firmware component. The HW/FW bit may be set to either a "1" value to indicate hardware component, or a "0" value to indicate a firmware component. Fields 207-211 are shown as an example; however, the present method may provide the page table entry 201 with more or less than three fields without an indication of a physical address of the data block 230 to which the page table entry 201 is associated.

In another example, the page table entry 201 may be generated based on the structure of existing page table entries. This may be done by, for example, zeroing bits that indicate the PFN in the existing structure. And, a bit of the existing structure may be reversed to indicate that the page table entry 201 is a special entry (e.g. for the system z architecture either bit in the range of bits 56-63 may be reversed). Further, a bit of the existing structure may be used to set values for indicating whether the entry is valid or not valid.

The present method may provide another structure for the added page table entries such as page table entry 220 for a data block 230. For example, the page table entry 220 may have a structure according to the x86 architecture. Page table entry 220 may contain a present bit (P); a read/write bit (R/W) which determines if writes are allowed to this page; a user/supervisor bit (U/S) which determines if user-mode processes can access the page; a few bits (PWT, PCD, PAT, and G) that determine how hardware caching works for these pages; an accessed bit (A) and a dirty bit (D); and finally, the page frame number (PFN) itself. The page table entry 220 may be created for only part of the data blocks 230. In one example, the page table entry 220 may not be created for data blocks 230.

Figure 4:
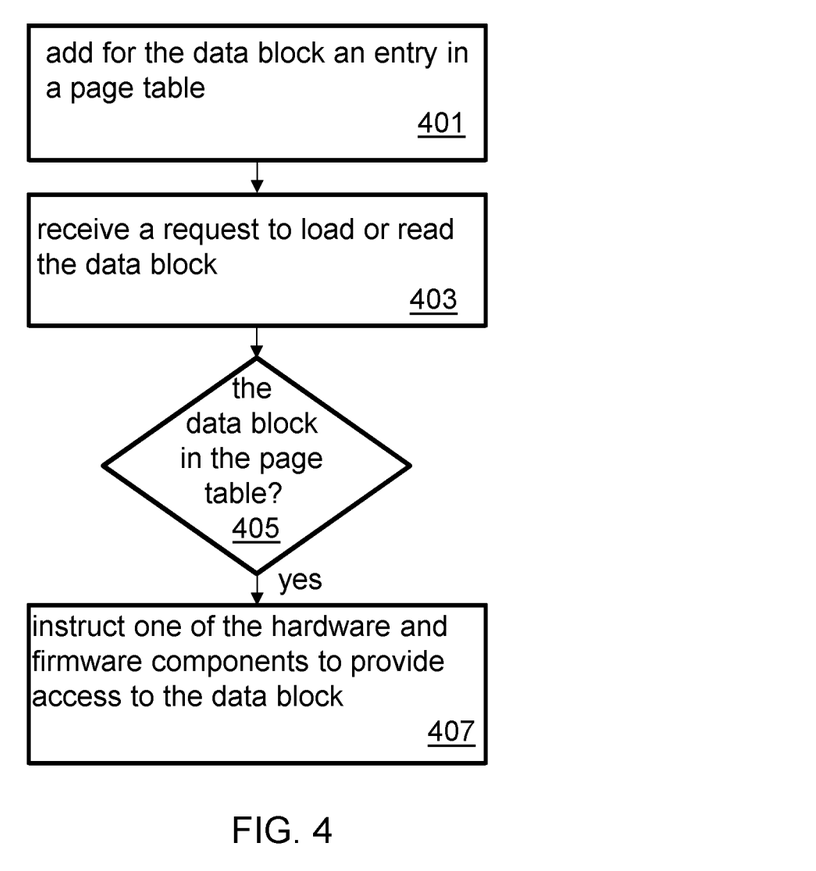
FIG. 4 is a flowchart of an exemplary method for providing access to a data block, in accordance with one or more aspects of the present invention.

FIG. 4 is a flowchart of an exemplary method for providing access to a data block in a device, e.g., device 221 (FIG. 2) of the processing system 100 (FIG. 1). In the example of FIG. 4, the access relates to the read access of the data block. In other words, referring to FIGS. 1, 2 & 4, the data block 230 is stored on the device 221 and the present example provides a method for loading and/or reading the stored data block 230.

The access to the data block 230 may for example be triggered or requested by a process e.g. that represents running application 170.

In step 401, the OS 146 may add for the data block 230 an entry in a page table 147. In one example, the OS 146 may add the entry in the page table 147 as soon as the process started, wherein the data block 230 is indicated in the instructions the process of application 170 to be executed.

In another example, the OS 146 may add the entry in the page table 147 in response to receiving a page fault message indicating that an entry is not associated with the data block 230 in the page table. The added entry may have a structure as described with reference to page table entry 201 of FIG. 3. The added entry may represent the data block 230.

In step 403, the MMU 143 may receive a request to load or read the data block 230. Step 403 may be (directly) triggered by the execution of application 170. For example, the application 170 may include an instruction for reading the data block 230. For that, the processor (e.g. CPU) 141 may instruct or request the MMU 143 to provide access to the data block 230. In another example, step 403 may be triggered by the page fault described above with reference to step 401.

For example, the request of the data block may be received by the MMU 143 from the OS 146 (via the CPU 141). The received request may for example indicate a virtual address of the data block 230. For example, the process associated with application 170 being executed may be assigned or associated with a virtual address space, defining ranges of virtual addresses that OS 146 makes available to the process. The virtual address of the data block 230 may be generated using that virtual address space.

The MMU 143 may check (inquiry 405) for the data block 230 in the page table 147 that a first entry of the added entries represents the data block 230. For that, the MMU 143 may, for example, generate an index (205) of the virtual address in order to access the page table 147. Using the generated index, the MMU 143 may read the entry of the page table 147 that is indicated by the index and may check if the read entry has a structure of the page table entry 201 or not. For example, the MMU 143 may check if the reversed bit value is there in the read entry. In other words, the MMU 143 may check whether the read entry has an indication of a physical address (PA) e.g. PFN or not.

In one example, the inquiry 405 may be performed upon detecting a TLB miss (e.g. no TLB entry found for the data block 230) for the requested data block 230.

In case the entry being read does not indicate a physical address, the MMU may instruct in step 407 one of the hardware and firmware components to provide access to the data block 230 using the added entry.

For example, the one of the hardware 123 and firmware 149 components may be randomly selected. In another example, the read entry may indicate the one of the hardware 123 and firmware 149 components e.g. by reading the HW/FW bit that indicates that the one of the hardware 123 and firmware 149 components is able to provide a physical address for the requested data block.

Figure 5:
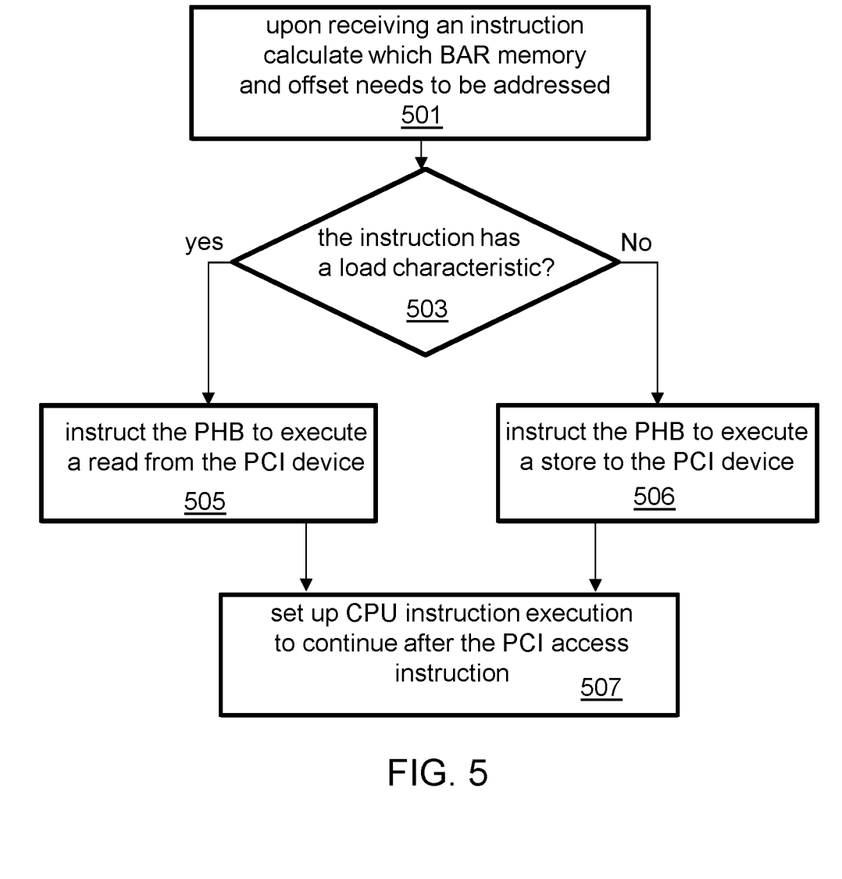
FIG. 5 is a flowchart of a method for accessing the data block, in accordance with one or more aspects of the present invention.

FIG. 5 is a flowchart of a method for accessing the data block 230 (FIG. 2) further detailing step 407 (FIG. 4). In this example, the one of the hardware and firmware components comprises the firmware component 149 (FIG. 1).

Referring collectively to FIGS. 1-5, upon receiving the instruction from the MMU 143 to provide access to the data block 230 using the added entry, the firmware component 149 may calculate in step 501 which BAR memory (of register 227B) and offset needs to be addressed by the virtual address and I/O Key that is indicated in the entry of the page table that corresponds to the data block 230.

The firmware component 149 determines or analyzes if the received instruction has a load or store characteristic (inquiry 503). In case of load characteristic (e.g. the instruction indicates a request to read the data block 230), the firmware component 149 instructs in step 505 the PHB to execute a read from the PCI device 221 via the PCI bus 165 to FW component owned memory e.g. 125 and then executes a modified received instruction on the result from the PCI device read. The received instruction may be modified such that it can be executed on the result of reading that is stored in the FW component owned memory. The obtaining and execution of the modified received instruction may be performed using an execute instruction such as the IBM Execute Relative Long (EXRL) instruction.

An example EXRL instruction may have an opcode, a register field specifying a register (R1) and an immediate field (I2) provides the ability to execute a single target instruction obtained from a memory location relative to the address of the EXRL instruction being executed. The single target instruction may be the modified received instruction described above.

When the EXRL instruction is fetched (e.g. from an address specified by the program counter of the processor executing the EXRL instruction) and executed, a single instruction (which may be the received instruction) may be obtained from a target address preferably determined by algebraically adding a sign extended signed immediate value (I2) of the EXRL instruction to the current program counter value. When the register (R1) field is not '0', bits e.g. 8-15 of a copy of the single target instruction at the second-operand address is modified by bits e.g. 56-63 of general register specified by the RI field of the EXRL instruction, and the resulting instruction, called the target instruction, is executed. In other words, for obtaining the modified received instruction the instruction at the second-operand address is modified by the contents of general register R1, and the resulting instruction is the modified received instruction.

In case of store characteristic (e.g. the instruction indicates a request to store the data block 230), the FW component 149 executes in step 506 the received instruction with the result from the PCI bus read with help of EXRL instructions and a PCI bus store, or by copying the instruction to temporary storage as described below and instructs the PHB to execute a store to the PCI device via the PCI bus.

In case of a combination of load and store characteristic, data is loaded before execution of the instruction and the result is stored afterwards a described above. In one example, the FW component 149 does not add an entry to the TLB for the read or stored data block 230 in order to operate on the same path again for consecutive instructions.

In step 507, the FW component 149 sets up CPU instruction execution to continue after the PCI access instruction.

An alternative method to the method involving the EXRL instruction may be used for obtaining and execution of the modified received instruction as follows: 1) the received instruction is copied to a temporary storage, 2) the instruction is decoded to identify relative and absolute addresses as well as registers used, 3) addresses are translated such that they point to temporary storage rather than their original virtual address, 4) a branch return instruction is placed after the copy of the received instruction in temporary storage, and 5) branch to the received instruction in temporary storage, which may then first triggers execution of the copied instruction followed by a return of execution flow to the instruction after the original received instruction.

Figure 6:
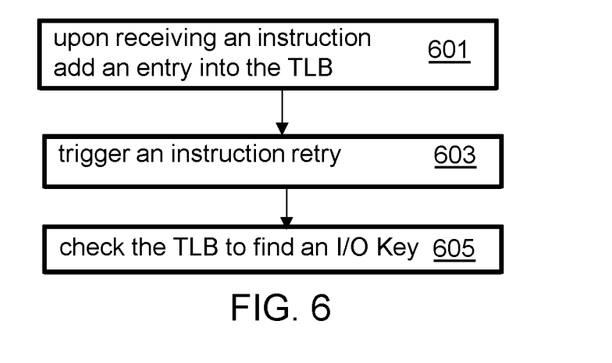
FIG. 6 is a flowchart of another method for accessing the data block, in accordance with one or more aspects of the present invention.

FIG. 6 is a flowchart of another method for accessing the data block 230 (FIG. 2) further detailing step 407 (FIG. 4). In this example, the one of the hardware and firmware components includes the firmware component 149 (FIG. 1).

Referring collectively to FIGS. 1-6, upon receiving the instruction from the MMU 143 to provide access to the data block 230 using the added entry, the firmware component 149 adds in step 601 an entry into the TLB 145. The added entry in the TLB 145 has a structure as described above with reference to FIG. 3 without indication of a physical address of the requested data block 230.

Upon adding the entry in the TLB, the MMU 143 triggers an instruction retry in step 603 such that the CPU retries the instruction to access the data block 230.

In step 605, in response to receiving the retried instruction the TLB 145 may be checked to find an I/O Key or the added entry for the data block 230 and in response to finding an entry that corresponds to the requested data block 230, the TLB 145 branches or instructs the FW component 149 to provide access to the data block 230. And, thereafter steps of FIG. 5 may be executed or repeated.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   establishing a page table within a processing system which comprises an entry having a page table entry structure with a physical address field for a data block indicative of a physical address of the data block;
   providing access to a further data block in a device of the processing system, the device being connected to a processor of the processing system via an extension bus, the processing system also comprising a memory connected to the processor via a memory bus, the processing system further including one or more components for controlling access to the device, the processing system comprising an operating system, wherein the providing comprises:
   adding by the operating system for the further data block a special entry in the page table of the processing system, the added special entry representing the further data block and the added special entry having a special page table entry format with no physical address indication for the data block, the special page table entry format of the added special entry being a different format than a format of the page table entry structure of the entry in the page table;
   receiving by a memory management unit (MMU) of the processing system a request of the further data block; and
   based on the added special entry, instructing by the MMU one component of the one or more components to provide access to the further data block using the added special entry in the page table by generating an address where the further data block is stored in the device.

2. The method of claim 1, further comprising upon receiving the request, checking by the MMU the page table for determining that the special entry represents the requested further data block.

3. The method of claim 2, wherein the MMU comprises a translation lookaside buffer (TLB), and based on receiving the request, the providing further comprises determining whether an entry of the TLB corresponds to the further data block, and based on detecting a TLB miss for the requested further data block, performing the checking.

4. The method of claim 3, further comprising controlling the MMU for preventing creation of an entry in the TLB indicating the further data block.

5. The method of claim 1, further comprising upon receiving the request:
   determining whether the special entry represents the further data block;
   based on determining that the special entry represents the further data block creating a TLB entry comprising the special entry in a TLB of the MMU, triggering a repeating of the receiving; and
   wherein the instructing is performed based on identifying in the TLB the special entry that represents the further data block.

6. The method of claim 1, wherein instructing the one or more components further comprises:
   using the special entry for generating the address where the further data block is stored in the device;
   performing a first reading of the further data block from the device using the generated address;
   loading the read data block into the memory; and performing a second reading of the further data block from the memory.

7. The method of claim 6, wherein the first reading is performed via a PCI host bridge (PHB) of the processing system.

8. The method of claim 1, wherein adding the special entry comprises:
sending by the operating system a request to the one component for adding the special entry; and
adding the special entry upon receiving an acknowledgment from the one component, wherein the added special entry comprises information on the sender of the acknowledgement.

9. The method of claim 1, wherein adding the special entry comprises:
registering by the operating system with the one component of the one or more components of the processing system the special entry to be added;
adding the special entry upon receiving a confirmation from the one component of the one or more components.

10. The method of claim 1, wherein the added entry indicates at least one of:
the added special entry is a valid or invalid entry;
the one component;
the further data block being a read only data block; or
storage characteristics for storing the further data block, the storage characteristics comprising at least one of storage technology for storing the further data block, copy on write, read/write/execute permissions, locking in the device.

11. The method of claim 10, further comprising selecting the one component using the information stored in the added special entry.

12. The method of claim 1, wherein the operating system comprises a hypervisor.

13. The method of claim 1, wherein the one component comprises at least one hardware or firmware component of the one or more components.

14. A system for facilitating access to a data block, the system comprising:
a memory; and
a processor communicatively coupled with the memory, wherein the system performs a method comprising:
establishing a page table within a processing system which comprises an entry having a page table entry structure with a physical address field for a data block indicative of a physical address of the data block;
providing access to a further data block in a device of the processing system, the device being connected to a processor of the processing system via an extension bus, the processing system also comprising a memory connected to the processor via a memory bus, the processing system further including one or more components for controlling access to the device, the processing system comprising an operating system, wherein the providing comprises:
adding by the operating system for the further data block a special entry in the page table of the processing system, the added special entry representing the further data block and the added special entry having a special page table entry format with no physical address indication for the data block, the special page table entry format of the added special entry being a different format than a format of the page table entry structure of the entry in the page table;
receiving by a memory management unit (MMU) of the processing system a request of the further data block; and
based on the added special entry, instructing by the MMU one component of the one or more components to provide access to the further data block using the added special entry in the page table by generating an address where the further data block is stored in the device.

15. The system of claim 14, further comprising upon receiving the request, checking by the MMU the page table for determining that the special entry represents the requested further data block.

16. The system of claim 15, wherein the MMU comprises a translation lookaside buffer (TLB), and based on receiving the request, the providing further comprises determining whether an entry of the TLB corresponds to the further data block, and based on detecting a TLB miss for the requested further data block, performing the checking.

17. The system of claim 16, further comprising controlling the MMU for preventing creation of an entry in the TLB indicating the further data block.

18. The system of claim 14, further comprising upon receiving the request:
determining whether the special entry represents the further data block;
based on determining that the special entry represents the further data block, creating a TLB entry comprising the special entry in a TLB of the MMU, triggering a repeating of the receiving; and
wherein the instructing is performed based on identifying in the TLB the special entry that represents the further data block.

19. The system of claim 14, wherein instructing the one or more components further comprises:
using the special entry for generating the address where the further data block is stored in the device;
performing a first reading of the further data block from the device using the generated address;
loading the read data block into the memory; and
performing a second reading of the further data block from the memory.

20. The system of claim 19, wherein the first reading is performed via a PCI host bridge (PHB) of the processing system.

* * * * *